United States Patent
Wursthorn et al.

(12) 
(10) Patent No.: US 6,449,112 B1
(45) Date of Patent: Sep. 10, 2002

(54) TAPE RECORDER HAVING A DRIVER CIRCUIT FOR A MATRIX HEAD

(75) Inventors: Edgar Wursthorn, Bad Dürrheim (DE); Jürgen Kaaden, Villingen-Schwenningen (DE)

(73) Assignee: Thomson Lincesing SA, Boulogne Cedex (FR)

( * ) Notice: Subject to any disclaimer, the term of this patent is extended or adjusted under 35 U.S.C. 154(b) by 0 days.

(21) Appl. No.: 09/416,912

(22) Filed: Oct. 13, 1999

(30) Foreign Application Priority Data

Nov. 11, 1998 (DE) .......................... 198 52 037

(51) Int. Cl.[7] .............................. G11B 15/12; G11B 5/29
(52) U.S. Cl. .............................. 360/63; 360/121; 360/46
(58) Field of Search ........................... 360/121, 46, 63, 360/61, 67, 68; 29/603.14; G11B 5/29

(56) References Cited

U.S. PATENT DOCUMENTS

| | | | |
|---|---|---|---|
| 5,063,467 A | * 11/1991 | Colineau et al. | 360/119 |
| 5,086,362 A | 2/1992 | Maurice | 360/121 |
| 5,124,869 A | * 6/1992 | Lehureau | 360/121 |
| 5,189,579 A | 2/1993 | Colineau | 360/121 |
| 5,394,286 A | 2/1995 | Burklin et al. | 360/121 |
| 5,420,734 A | * 5/1995 | Colineau et al. | 360/113 |
| 5,671,106 A | 9/1997 | Lehureau | 360/121 |
| 5,933,940 A | * 8/1999 | Maillot et al. | 29/603.14 |

FOREIGN PATENT DOCUMENTS

| | | | | |
|---|---|---|---|---|
| DE | 19852037 A1 | * 5/2000 | | G11B/5/29 |
| JP | 01258967 A | * 10/1989 | | B41J/3/28 |
| JP | 04229401 A | * 8/1992 | | G11B/5/02 |

* cited by examiner

Primary Examiner—David Hudspeth
Assistant Examiner—Dan I Davidson
(74) Attorney, Agent, or Firm—Joseph S. Tripoli; Harvey D. Fried; Joseph J. Kolodka

(57) ABSTRACT

Tape recorder having a group of write heads which are arranged like a matrix in rows and columns, with each write head assigned in one row line and in one column line, and having a driver circuit for passing current through the row and column lines. A write head magnetizes a magnetic tape permanently only when its associated row and column lines have currents applied to them causing magnetic fields that reinforce one another in the magnetic tape. A common row return line is provided to which all the row lines are connected and a common column return line is provided to which all the column lines are connected.

14 Claims, 3 Drawing Sheets

TAPE RECORDER HAVING A DRIVER CIRCUIT FOR A MATRIX HEAD

FIELD OF THE INVENTION

The invention relates to a tape recorder having a group of write heads, which are arranged like a matrix in rows and columns. The invention is based on a tape recorder according to the precharacterizing clause of Claim 1.

In the following text, the term tape recorder means any apparatus in which signals, data or information are recorded in digital form on a magnetic tape, and/or are read from this magnetic tape. Independently of this, these apparatuses may also have other functions, for example they may be combined with an electronic camera or with a computer. In the latter case, such apparatuses are also called "data streamers".

BACKGROUND OF THE INVENTION

The publication "Towards the Multitrack Digital Video Tape Recorder" by Francois Maurice in "The Magnetic Society of Japan" 1991, Volume 15, pages 389 to 394, discloses a tape recorder in which a large number of data and/or signal tracks are recorded on a magnetic tape using the longitudinal track recording method. In the apparatus disclosed in this document, the data tracks are written simultaneously by means of a matrix head. In an exemplary embodiment of this apparatus, up to 80 parallel tracks are written with a width of 7 μm without any guard tracks, that is to say without any intermediate space between the individual tracks.

EP 0 764 943 discloses a tape recorder having a matrix head. The matrix head comprises a ferrite block which has grooves in the longitudinal and transverse directions and to which a thin-film structure is applied, which has a column at the intersections of the grooves. Insulating, electrical conductors are located in the grooves in the ferrite block. When a current flows through the conductors, then a magnetic field occurs in the external area in the region of the columns. The ferrite block thus combines a large number of write heads, which are produced jointly in a single process.

A magnetic field can be produced in any individual column by current switching and correct timing of the association of currents in the row and column directions. To this end, a signal which is applied to the data channels and which initiates currents in the row lines is correlated in time with a rapidly switched selection current in the column lines. In the situation where the resultant magnetic fields which are caused by the currents in the row and column lines reinforce one another in the external area of a column, a magnetic tape which is present at the relevant column is remanently magnetized. In the converse case, where the said magnetic fields cancel one another out in the external area, a magnetic tape which is present at the relevant column is not remanently magnetized.

On the one hand, such a system allows a high data rate to be recorded at a high storage density on a magnetic tape. On the other hand, this system places very stringent requirements on the driver circuit for the matrix head, as is made clear in the analyses below.

In the case of a matrix head having eight data lines which define the rows of the matrix head, and having ten selection lines which define the columns of the matrix head, and at a data rate of 125 kbps per track, a complete sequence of the selection lines is completed after 4 μs. This means that only 400 ns are available for writing for each column in the matrix head. In this case, it must also be remembered that the current flowing in the selection line has to reach its maximum value in both one direction and in the other direction during this time interval, as will be explained in more detail further below. The currents in the data lines are ±100 mA and those in the selection lines are ±200 mA. In order to ensure that the magnetic tape is always magnetized reliably and uniformly, the values of the currents must be maintained accurately, and they must be switched quickly and at exact times, matched to one another. In practice, it has been found to be expedient for the currents to rise to the their respective maximum values, and to fall from the respective maximum values to zero, within 20 ns.

SUMMARY OF THE INVENTION

Based on this, one object of the invention is to provide a tape recorder which satisfies all these requirements and, furthermore, whose circuitry is less complex than the known solutions.

This object is achieved by a tape recorder according to Claim 1. The solution according to the invention is characterized in that a common row return line is provided to which all the data lines are connected, and in that a common column return line is provided to which all the selection lines are connected.

The column return lines have the advantage that this reduces the circuit complexity for a driver circuit.

Means may expediently be provided in order to switch column lines through which current is not being passed to a high impedance. This advantageously ensures that a current is only ever flowing in a single column of the matrix head. This has the advantage that it is impossible for any uncontrolled magnetic fields to occur at the individual write heads in the matrix head, so that the conditions for magnetization of the magnetic tape are always defined.

In order that the current can flow in both directions in the associated column lines, it can be expedient to provide for the capability to connect the column return line selectively to earth or to an operating voltage.

It is particularly advantageous if the common row return line is clamped to a voltage whose magnitude corresponds to approximately half the maximum magnitude of the voltage which is applied to the column return line. This results, in a particularly simple manner, in the currents in the column lines being twice as great as those in the data lines.

In one exemplary embodiment of the invention, in which the data in the data lines are coded without any direct current, it is advantageous if the common row return line is connected to a capacitor. It is particularly advantageous if the capacitor is connected, with low impedance, by means of a suitable network to a predetermined operating voltage.

Finally, a voltage supply can also be provided which regulates the supply voltage of the driver circuit in such a way that the magnetic fields produced by the matrix head are matched to different tape materials. Different characteristics of different matrix heads can also be compensated for in the same way, and power losses in the driver circuit can be minimized. In this context, it should be noted that, owing to the special manufacturing process, it is virtually impossible to distinguish between the characteristics of individual write heads which are part of a single matrix head. On the other hand, significant differences may occur between different matrix heads.

One particular advantage of the tape recorder according to the invention is that further matrix heads can be connected to the driver circuit without significant additional complexity. Further advantages of the invention are the subject matter of dependent claims.

BRIEF DESCRIPTION OF THE DRAWINGS

The drawing shows an exemplary embodiment of the invention. Identical or mutually corresponding elements are provided with the same reference symbols in the figures, in which.

DETAILED DESCRIPTION OF PREFERED EMBODIMENTS

Figure 1:
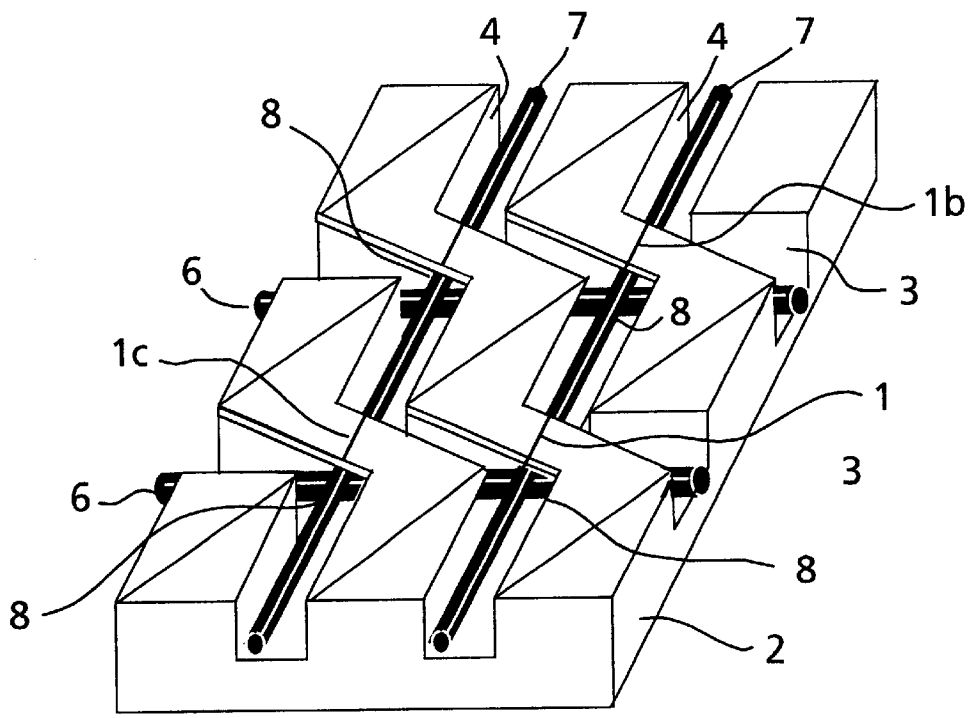
FIG. 1 shows a detail of a matrix head of a tape recorder according to the invention.

FIG. 1 shows a perspective illustration of a detail from a matrix head with which the tape recorder according to the invention is equipped. FIG. 1 shows only four write heads, with their associated head columns 1. In fact, the matrix head of the tape recorder of the invention has more than 80 write heads, however, which are arranged in eight rows and ten columns, as will be explained further below in conjunction with FIG. 2. The matrix head comprises a ferrite block 2, which has longitudinal grooves 3 and transverse grooves 4. The longitudinal and transverse grooves 3, 4 accommodate electrically insulated row and column lines 6, 7, respectively, which intersect at intersections 8. A link 9 composed of magnetic material extends over each intersection 8. The links 9 are split above the intersections by one of the said head columns 1. When a magnetic field is produced in the associated limbs of an individual write head, this field emerges into the external area in the region of the respective head column. A magnetic field can be produced in each individual column 1 by means of switched currents and assignments of the currents in the row and column lines 6, 7 at the right times, which magnetic field is of sufficient intensity to magnetize remanently a magnetic tape which is present at the matrix head. For the sake of clarity, the magnetic tape is not shown in the figures.

Figure 2:
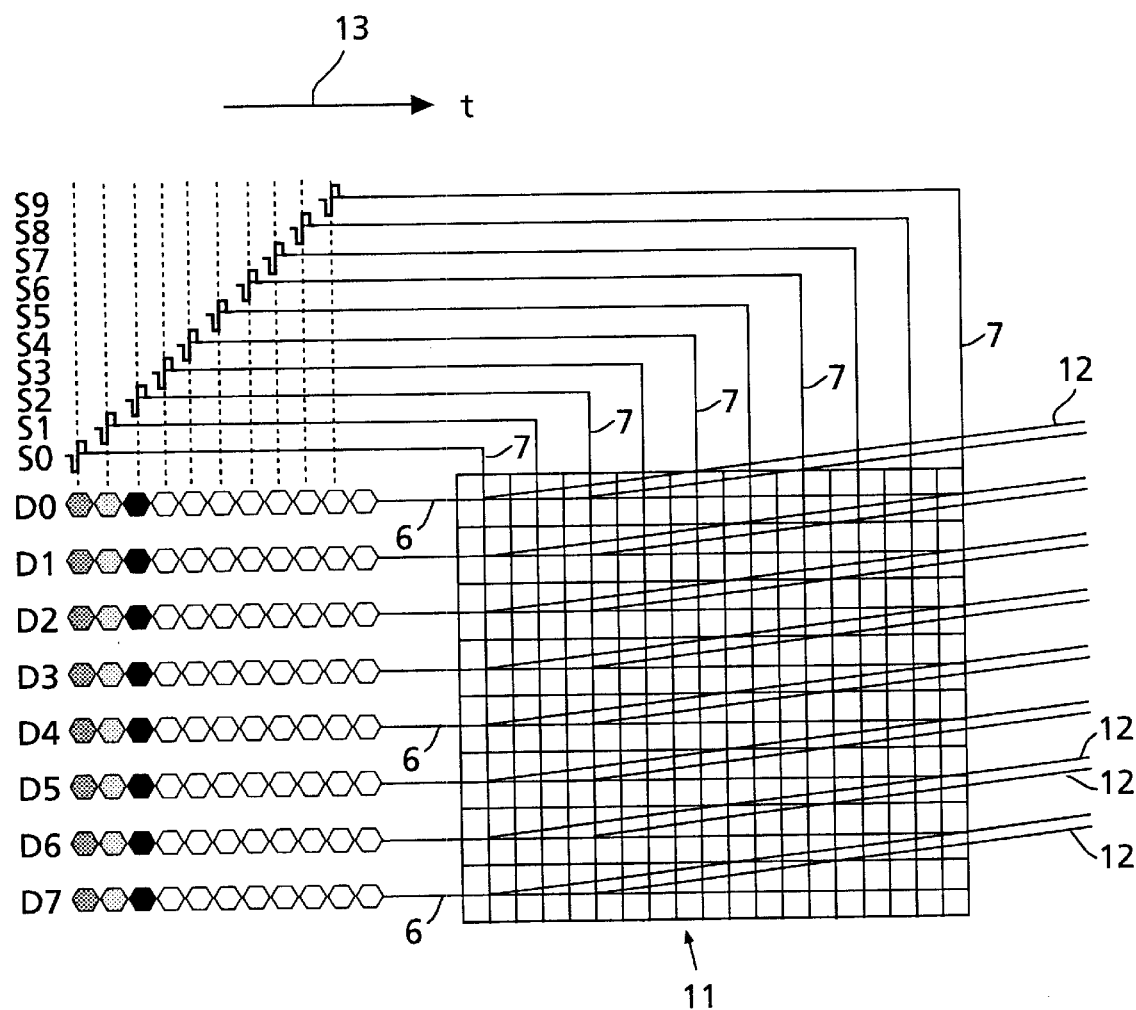
FIG. 2 shows, schematically, the sequence of how data are written to a magnetic tape using an 8×10 matrix head.

The process of writing to the magnetic tape will now be explained in more detail in conjunction with FIG. 2. The right-hand lower part of FIG. 2 shows, schematically, an 8×10 matrix write head, which is denoted over all by the reference symbol 11. The matrix head is split into eight rows and ten columns, and comprises 80 individual write heads, which are each suitable for writing one data track. The data lines D0–D7 are each connected to a row line 6. A corresponding situation applies to the selection lines S0–S9 and the column lines 7. The writing process used by the 80 write heads is to write in columns, successively. As can be seen from the timing sequence of the pulses illustrated in FIG. 2, all the rows in that matrix column which is associated with the selection line S0 are written first of all. After this, the matrix columns which are associated with the selection lines S1–S9 are connected successively. In the following text, the process of writing a single matrix column is also referred to as the "selection cycle". The time sequence of the selection cycles, starting with the selection line S0 and ending with the selection line S9, are also described in the following text by the term "selection sequence". The time sequence for the individual selection cycles is indicated by the arrow 13 in FIG. 2.

The magnetic characteristics of the matrix head and of the magnetic tape are matched to one another such that the magnetic tape is magnetized remanently only when the magnetic fields which are produced by a row line 6 as well as by a column line 7 in a specific head reinforce one another. The current in a row line 6 can be selected to flow in both one direction and the other direction. This is indicated in FIG. 2 by the time profile of the signals on the data lines D0–D7. In order to ensure that a write process is achieved on the magnetic tape by each head during each selection cycle irrespective of the current direction in a row line 6, it is thus necessary for the current in a column line 7 to assume both its negative and its positive maximum value during a selection cycle. This ensures that each write head remanently magnetizes the magnetic tape, in which case the magnetization may assume two different states. Each write head writes a single data track 12 to the magnetic tape, so that a total of 80 tracks are written in parallel. For the sake of clarity, however, FIG. 2 shows only a small number of these 80 data tracks.

Each data bit is represented by two differently magnetized sections on the magnetic tape, with in each case one section being written by each write head in the presently active column of the matrix head during a selection cycle. In one exemplary embodiment of the invention, the data rate per data track is 125 kbps, so that $250 \times 10^3$ magnetization sections can be produced per second on the magnetic tape. A time of 4 $\mu$s is thus available for a sequence of 10 selection cycles, that is to say 400 ns per column of the matrix head 11.

In order to ensure that the timing of the current Iz in the row lines 6 is matched as accurately as possible to the current Is in the column lines 7, it is necessary for the rise and fall times of the said currents to be in the region of 20 ns. The time profile of the row column Iz and of the column current Is is shown in greater detail in FIG. 3, using the example of a row line 6 and a column line 7.

Figure 3:
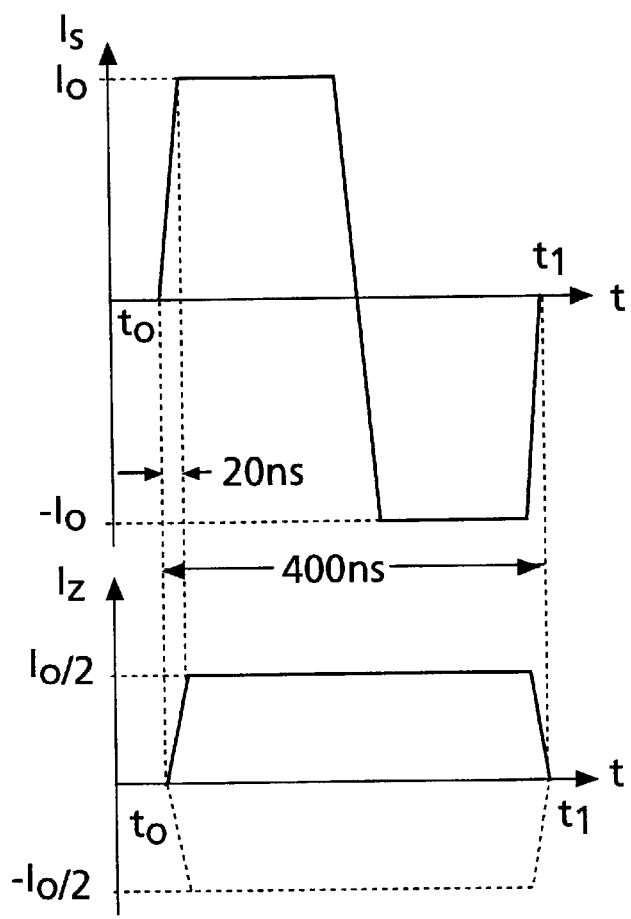
FIG. 3 shows the timing sequence of the data and selection signals which are applied to the matrix head from FIG. 2.

As can be seen from FIG. 3, during a selection cycle which starts at the time t0 and ends at the time t1, the column current Is assumes both its positive maximum value I0 and its negative maximum value −I0. In contrast to this, the row current Iz assumes either its positive maximum value I0/2 or its negative maximum value −I0/2 during a selection cycle. Since the column current Is changes its direction, this always ensures that the magnetic tape is magnetized, irrespective of the direction of the row current Iz. The direction of the row current Iz defines the magnetization state which the relevant write head impresses on the magnetic tape. Switching relatively high currents at high frequency while maintaining a high level of accuracy with regard to both time and magnitude discrepancies places stringent requirements on the driver circuit associated with the matrix head. Furthermore, FIG. 3 clearly shows that the magnitude of the row current Iz is only half as great as that of the column current Is.

Figure 4:
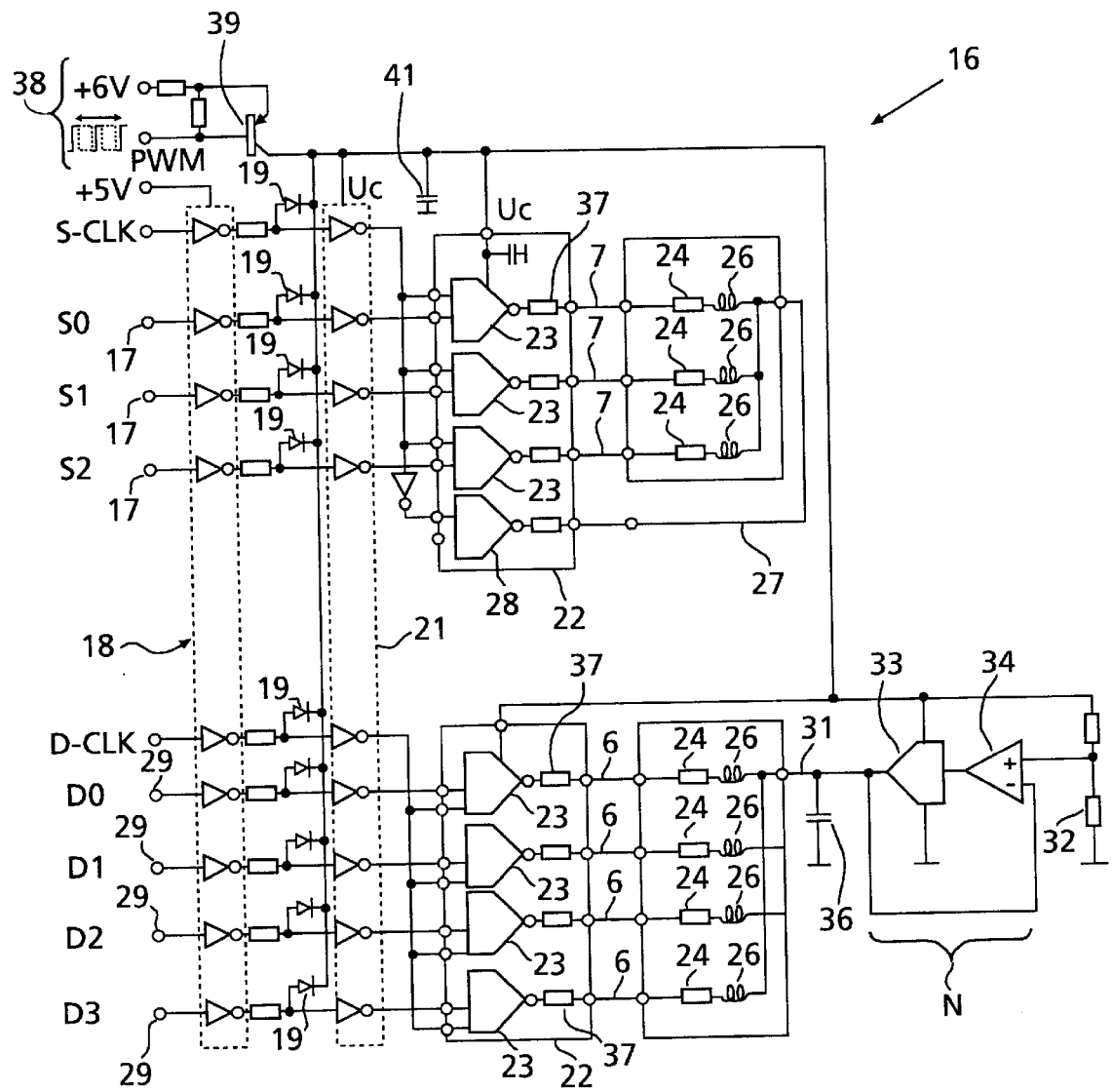
FIG. 4 shows a block diagram for a driver circuit of a matrix head.

FIG. 4 shows a block diagram of a driver circuit which is denoted, overall, by the reference symbol 16 and which is connected to a matrix head in a tape recorder according to the invention. For clarity, the illustrated driver circuit 16 has been reduced to a matrix head 11 with three column lines 7 and four row lines 6. However, the block diagram can be transferred directly to driver circuits which are connected to matrix heads which have a greater or lesser number of rows and column.

Inputs 17 at which the selection lines S0, S1 and S2 are connected can be seen in the upper region of FIG. 4. The corresponding input signals are amplified in a first amplifier stage 18, and are clamped by means of Schottky diodes 19 to the operating voltage of the subsequent amplifier stages. This circuit allows the said first amplifier stage 18 to be operated, as a rule, at a higher operating voltage than the subsequent amplifier stages, which apply current to the matrix write head 11. This allows the output amplifier to be operated with an optimized operating voltage in order (while taking account of the electrical and magnetic characteristics of the respective matrix head 11) to achieve matching to different tape materials and/or to ensure that the electrical power consumption of the driver circuit 16 is as low as possible. A downstream, second amplifier stage 21 operates with a regulated operating voltage Uc. An output amplifier stage 22 comprises three individual amplifiers 23, which are each connected to one column line 7. The resistance of the respective column line 7 and its inductance are represented by a resistor 24 and by a coil 26 in the block diagram. The second connection of the column lines 7 is in each case connected to a common column return line 27. The column return line 27 is connected to a switching element 28, which selectively produces a connection to each or to the operating voltage $U_c$. The individual amplifiers are likewise connected alternatively to the operating voltage $U_c$ or to earth to form the column return line, so that the voltage change across each selection line 7 is $\pm U_c$. In addition to the selection lines S0–S2, a selection clock signal S-CLK is connected in a corresponding manner to each amplifier 23 and to the switching element 28. Current flows through a column line 7 only when a selection signal and a selection clock signal are both present at the same time. If this is not the case, the respective column line 7 is switched to a high impedance, thus ensuring that current always flows only in a single column line, with the circuit being closed exclusively via the common column return line 27. This means that current always flows in only a single column line during a selection cycle.

In comparison with conventional circuits, in which both connections of each individual column line 7 can be connected to the operating voltage Uc or to earth, the present circuit according to the invention has the major advantage that its design is considerably simpler, owing to the common column return line 26. Instead of having to provide two switchable connections to the operating voltage and to earth for each column line 7 as with a conventional design, only one such connection is provided in each case and, in addition, only one further switching element 28 for the common column return line 26. This advantage obviously becomes more important the greater the number of columns that a matrix head has.

The data lines D0–D3 are connected to the inputs 29 of the driver circuit 16. The rest of the design of the driver circuit corresponds to that which has already been described in conjunction with the selection lines S0–S2 and the column lines, with the difference that the data lines D0–D3 are, by definition, connected to in each case one row line 6. A further significant difference is the fact that the second connection of each row line 6 is connected to a common row return line 31. Current always flows through a row line 6 whenever a data signal is present on the associated data line and a clock signal D-CLK is present at an input connection 30 at the same time. A network N clamps the row return line 31 to half the operating voltage $U_c/2$. To this end, the network N comprises a voltage divider 32, an amplifier 33 and a comparator 34. One input of the comparator 34 is connected to a tap on the voltage divider 32. The other input of the comparator 34 is connected to the output of the amplifier 33, which is at the same time connected to the common row return line 31. Furthermore, a capacitor 36 is connected to the row return line.

With regards to AC, the capacitor represents a short circuit between the data return line 31 and earth potential, so that the current from all the row lines 6 flows via the capacitor 36, and not between the individual row lines 6. The latter would lead to changes in the magnetic fields produced by the write heads, and would thus call reliable magnetization of the magnetic tape into question. The data in the data lines are coded without any DC voltage element ("DC-free"), so that, on average, the potential on the row return line 31 remains Uc/2. Since, considered statistically, the data lines D0–D9 which are connected to the row lines 6 may be "High" or "Low" for a relatively long time period, which corresponds, for example, to 10 bits, the network N ensures low-impedance equalization, that is to say the row return line always remains at the potential Uc/2.

The amplifiers 23 for the data lines D0–D3 in the output stage 22 can selectively be connected to earth or to the operating voltage $U_c$. Since the common row return line 31 is clamped at $U_c/2$, the voltage change of the output stage 22 of the data lines D0–D3 is thus $\pm U_c/2$.

For the same reasons as those which have already been described in conjunction with the common column return line, the common row return line leads to a considerable simplification of the driver circuit 16.

Owing to the different voltage changes, the ratio of the currents in the column lines 7 and row lines 6 is 2:1, as is required for the matrix head 11 to operate correctly. Adjustable resistors 37 are provided at the outputs of the amplifiers 23 in the driver circuit 16, in order to trim the electrical characteristics of individual heads at the factory.

The second amplification stage 21 and the output amplifier stages 22 are connected to an operating voltage source 38, which supplies a variable operating voltage $U_c$ by means of a switching transistor 39 which is driven by a pulse-width-modulated signal. The output signal from the switching transistor 39 is smoothed by a smoothing capacitor 41, and forms the variable operating voltage $U_c$ for the second amplifier stage 21 and the output amplifier stage 22. The voltage may be varied, for example, between 3 volts and 6 volts.

What is claimed is:

1. Tape recorder having a group of write heads which are arranged like a matrix in rows and columns, in which case each write head is assigned in each case one row line and in each case one column line, and having a driver circuit which is suitable for passing current through the row and column lines, in which case a write head magnetizes a magnetic tape remanently only when its associated row and column lines have currents applied to them which cause magnetic fields which reinforce one another in the magnetic tape, characterized in that a common row return line is provided, to which all the row lines are connected, and in that a common column return line is provided to which all the column lines are connected.

2. Tape recorder according to claim 1, characterized in that means are provided in order to switch column lines through which current is not being passed to a high impedance.

3. Tape recorder according to claim 1, characterized in that switching means are provided in order selectively to connect the common column return line to earth or to an operating voltage.

4. Tape recorder according to claim 1, characterized in that the common row return line is clamped to a voltage whose magnitude corresponds approximately to half the maximum magnitude of the voltage applied to the column return line.

5. Tape recorder according to claim 1, characterized in that the magnitude of the current in a row line corresponds approximately to half the current in a column line.

6. Tape recorder according to claim 4, characterized in that a capacitor is connected to the common row return line.

7. Tape recorder according to claim 6, characterized in that the capacitor is connected, with low impedance, by means of a network to a predetermined operating voltage ($U_c/2$).

8. Tape recorder according to claim 1, characterized in that an associated driver circuit is in each case provided for the row lines and for the column lines.

9. Tape recorder according to claim 8, characterized in that the means in order to switch those column lines through which current is not being passed to a high impedance are integrated in the driver circuit for the column lines.

10. Tape recorder according to claim 1, characterized in that a regulating circuit is provided, which regulates the supply voltage (Uc) to the driver circuit in order to minimize power losses.

11. Tape recorder according to claim 1, characterized in that a regulating circuit is provided which regulates the supply voltage (Uc) of the driver circuit for matching to different tape materials.

12. Tape recorder according to claim 10, characterized in that the regulating circuit has a switching element which can be switched between a switched-on state and a switched-off state, and in that a smoothing capacitor is provided which smooths the output signal of the signal element.

13. Tape recorder according to claim 11, characterized in that the regulating circuit has a switching element which can be switched between a switched-on state and a switched-off state, and in that a smoothing capacitor is provided which smooths the output signal of the signal element.

14. Tape recorder according to claim 1, characterized in that a further group of write heads is provided, which are arranged like a matrix in rows and columns, in that the column lines in the first group of write heads are connected to the corresponding column lines in the second groups of write heads, and in that the row lines in the two groups of write heads remain independent of one another.

* * * * *